Dec. 22, 1953  N. C. PRICE  2,663,140
FUEL SYSTEM FOR RAM JETS
Original Filed Aug. 23, 1946  5 Sheets-Sheet 1
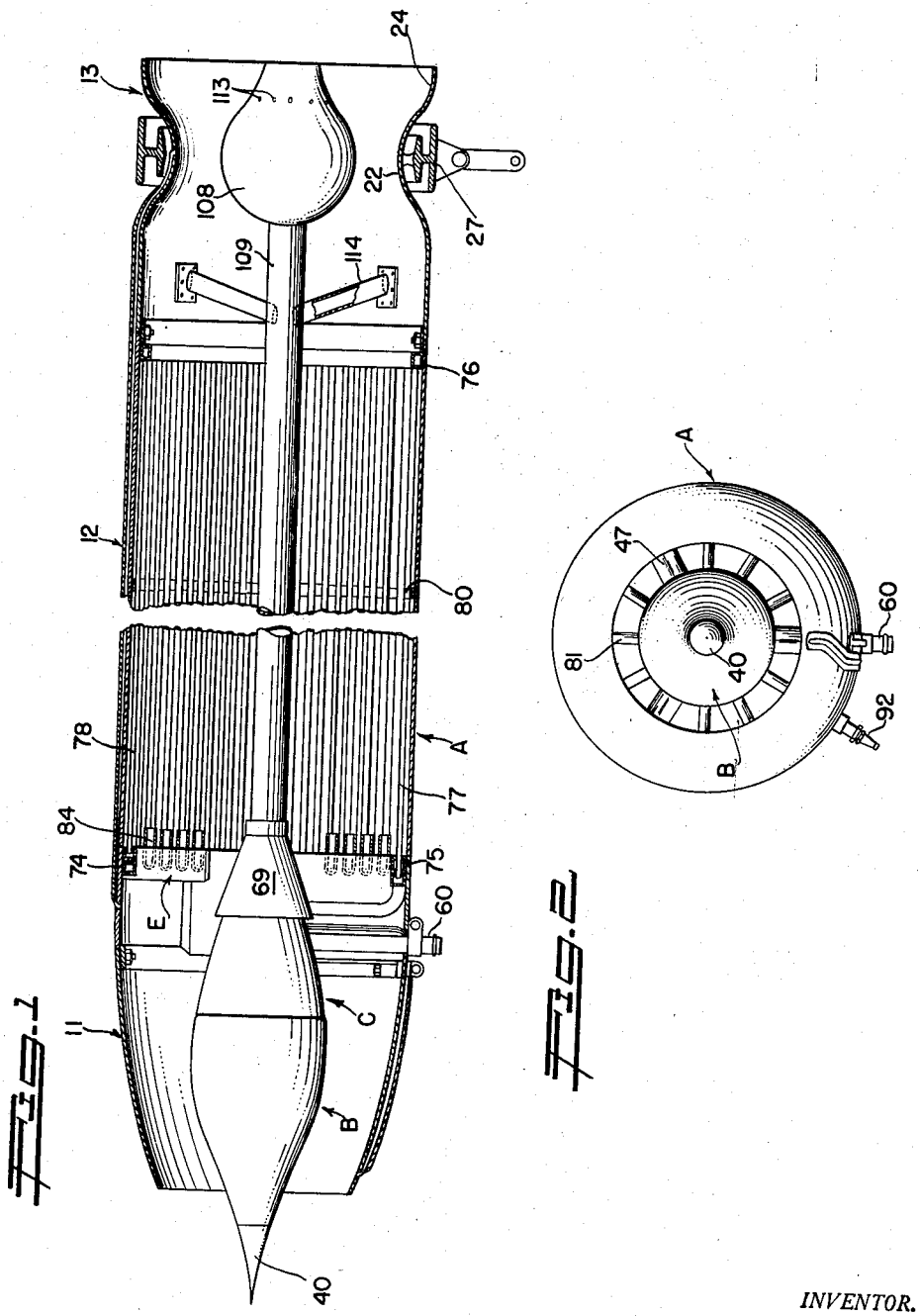
INVENTOR.
NATHAN C. PRICE
BY
George C. Sullivan
Agent

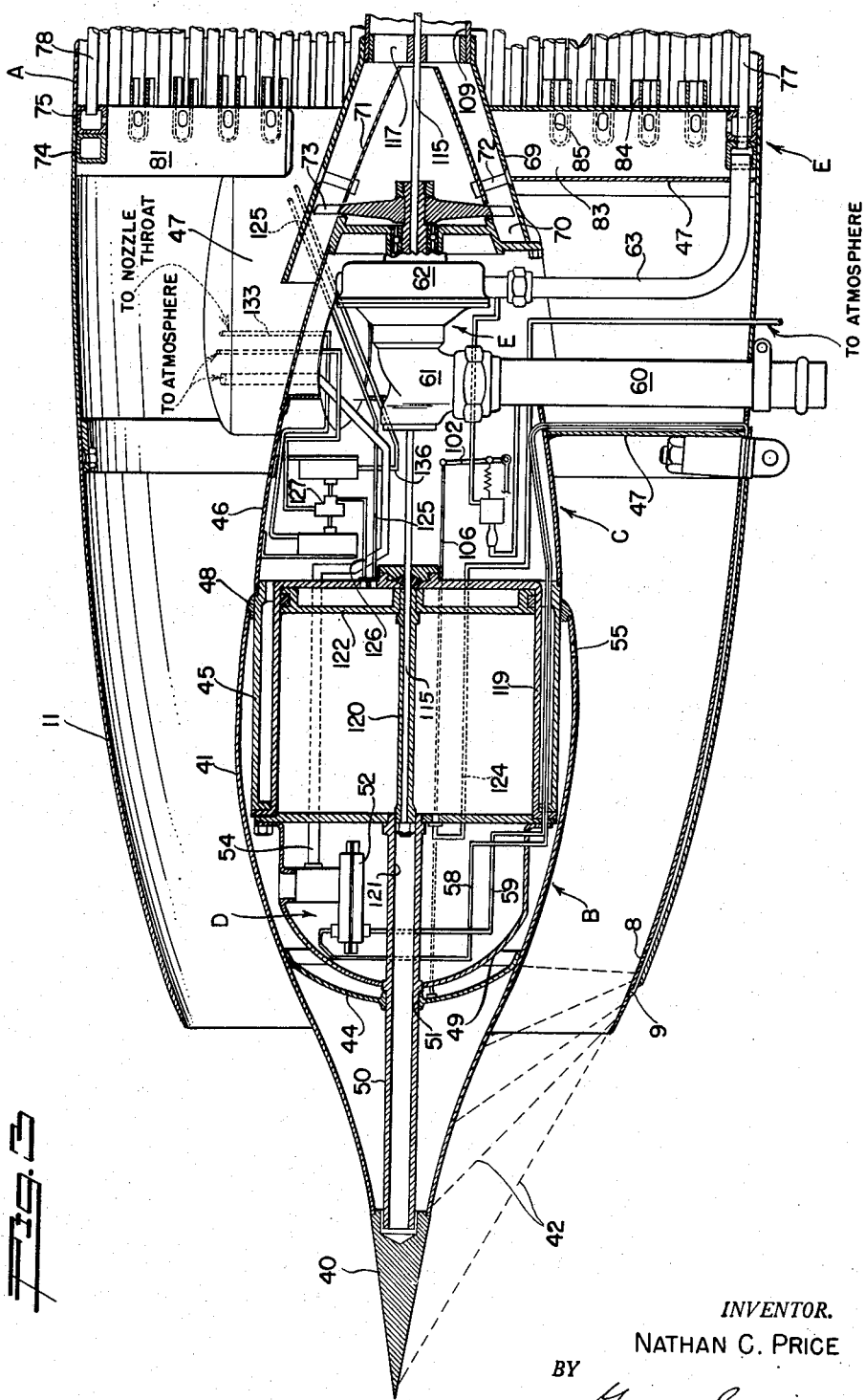

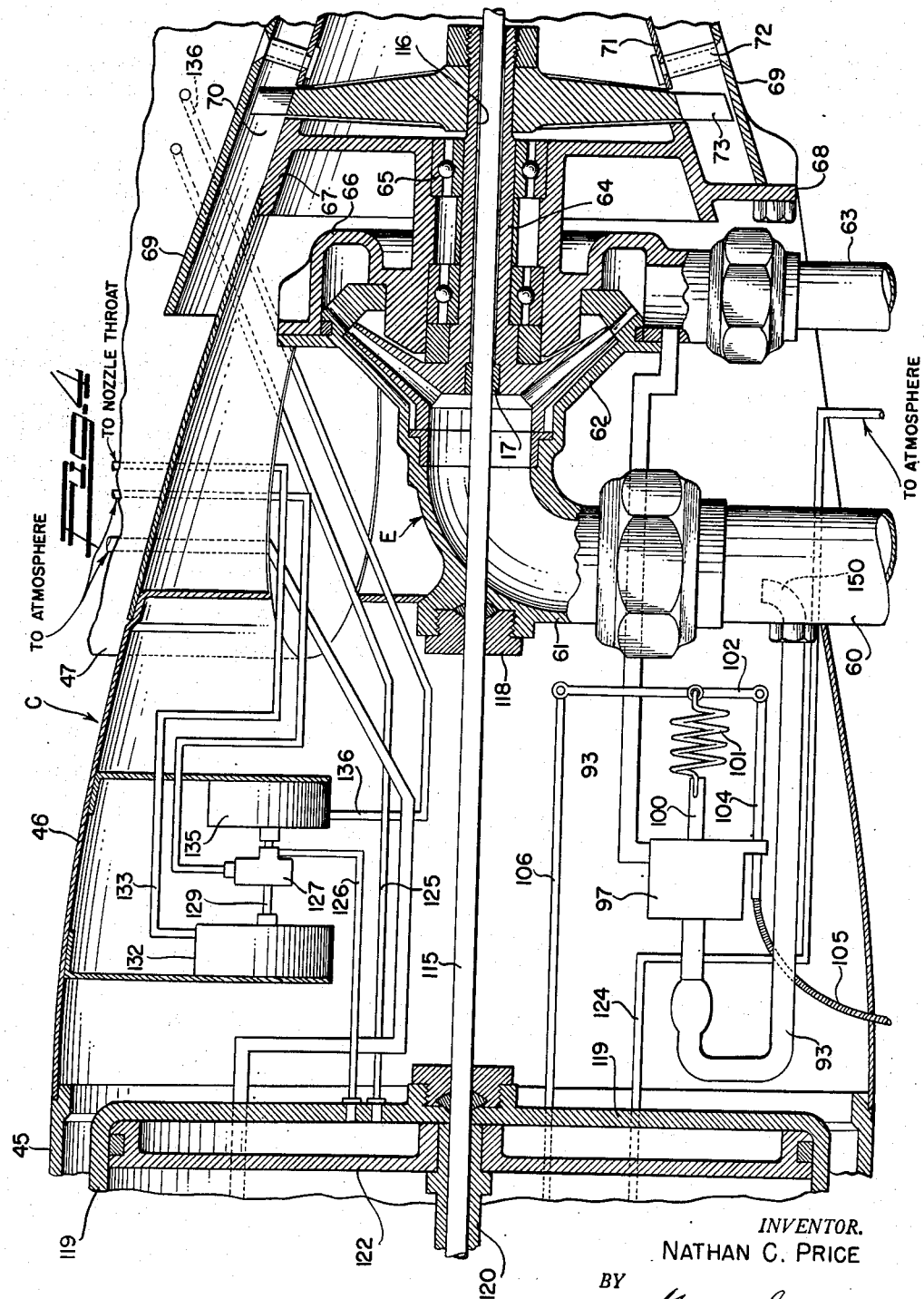

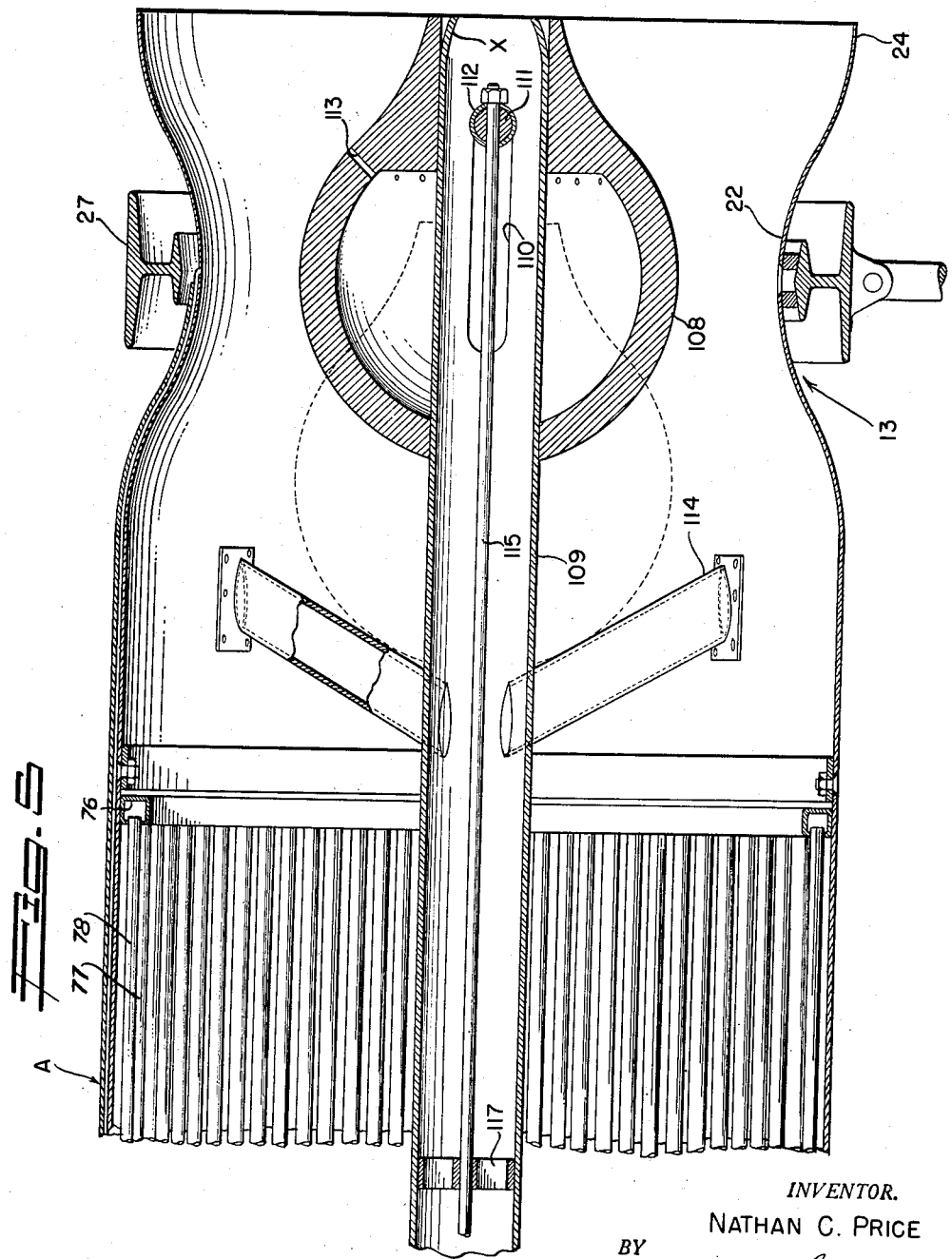

Dec. 22, 1953 N. C. PRICE 2,663,140
FUEL SYSTEM FOR RAM JETS
Original Filed Aug. 23, 1946 5 Sheets-Sheet 5

INVENTOR.
NATHAN C. PRICE
BY
George C. Sullivan
Agent

Patented Dec. 22, 1953

2,663,140

UNITED STATES PATENT OFFICE 2,663,140

FUEL SYSTEM FOR RAM JETS

Nathan C. Price, Los Angeles, Calif., assignor to Lockheed Aircraft Corporation, Burbank, Calif.

Original application August 23, 1946, Serial No. 692,423, now Patent No. 2,540,594, dated February 6, 1951. Divided and this application October 20, 1947, Serial No. 780,864

12 Claims. (Cl. 60—35.6)

This invention relates to reactive propulsion engines of the ram jet type and relates more particularly to fuel systems for this class of engines.

This application is a division of my co-pending application, Serial No. 692,423, filed August 23, 1946, now Patent No. 2,540,594, February 6, 1951.

Ram jet engines are practical and efficient in the propulsion of aircraft and air borne missiles at high speeds and high altitudes where reciprocating engines and turbo-jet engines are unable to operate at reasonable efficiencies. However, the fuel economy of a ram jet engine is low and the range is, therefore, limited, unless the air-fuel ratio in the combustion chamber is maintained substantally constant through the changes in translatory speeds and altitudes of the missile or aircraft. The present day ram jet power plants make no effective provision for the maintenance of a substantially constant air-fuel ratio during flight at varying speeds and altitudes.

It is, therefore, a general object of the invention to provide a ram jet power plant capable of operating at high fuel economy throughout widely varying translatory speeds and altitudes.

Another object of the invention is to provide a ram jet power plant characterized by a fuel system for maintaining a substantially constant air-fuel ratio in the combustion chamber irrespective of translatory speed and altitude. The fuel system employs a centrifugal pump driven by an air turbine which, in turn, is driven by the rammed air column. At a Mach number of approximately 3.0 the spouting velocity of the reactive power plant is approximately twice the translatory velocity, bringing the point of maximum thrust into coincidence with that required for maximum range and high efficiency. The fuel pump, driven by the air turbine, is used in conjunction with a fuel system automatically controlled and capable of manual regulation.

Another object of the invention is to provide a ram jet power unit of the class described utilizing the exhaust air from the air turbine of the fuel supply system to cool and protect elements of the propulsive nozzle. The exhaust air from the air turbine is circulated through various elements of the nozzle exposed to the high temperature gas stream in order to cool the same.

Another object of the invention is to provide a ram jet unit wherein the exhaust air from the air turbine passes through elements of the propulsive nozzle to cool the same and then discharges from a nozzle in the form of a propulsive jet to assist the primary propulsion jet of hot gases and air. The nozzle for the cooling air exhausted by the air turbine, in addition to augmenting the reactive thrust as just mentioned, maintains a slight back pressure in the exhaust air stream to insure the flow of cooling air through the nozzle parts.

A further object of the invention is to provide a ram jet of the class referred to wherein the fuel pump and the air turbine for driving the same are housed in the diffuser or island adjacent the inlet ram and the entrance passage of the air turbine is arranged to receive or draw off the boundary layer air from the surface of the island.

Other features and objects of the invention will become apparent from the following detailed description of a typical embodiment, throughout which reference will be made to the accompanying drawings wherein:

Figure 1 is a longitudinal sectional view of the ram jet;

Figure 2 is a front view of the power plant;

Figure 3 is an enlarged longitudinal sectional view of the forward portion of the power plant showing the air turbine tnd adjacent parts;

Figure 4 is an enlarged fragmentary sectional view of the island portion illustrating the air turbine and fuel pump;

Figure 5 is an enlarged longitudinal sectional view of the nozzle portion of the power plant.

Figure 6:
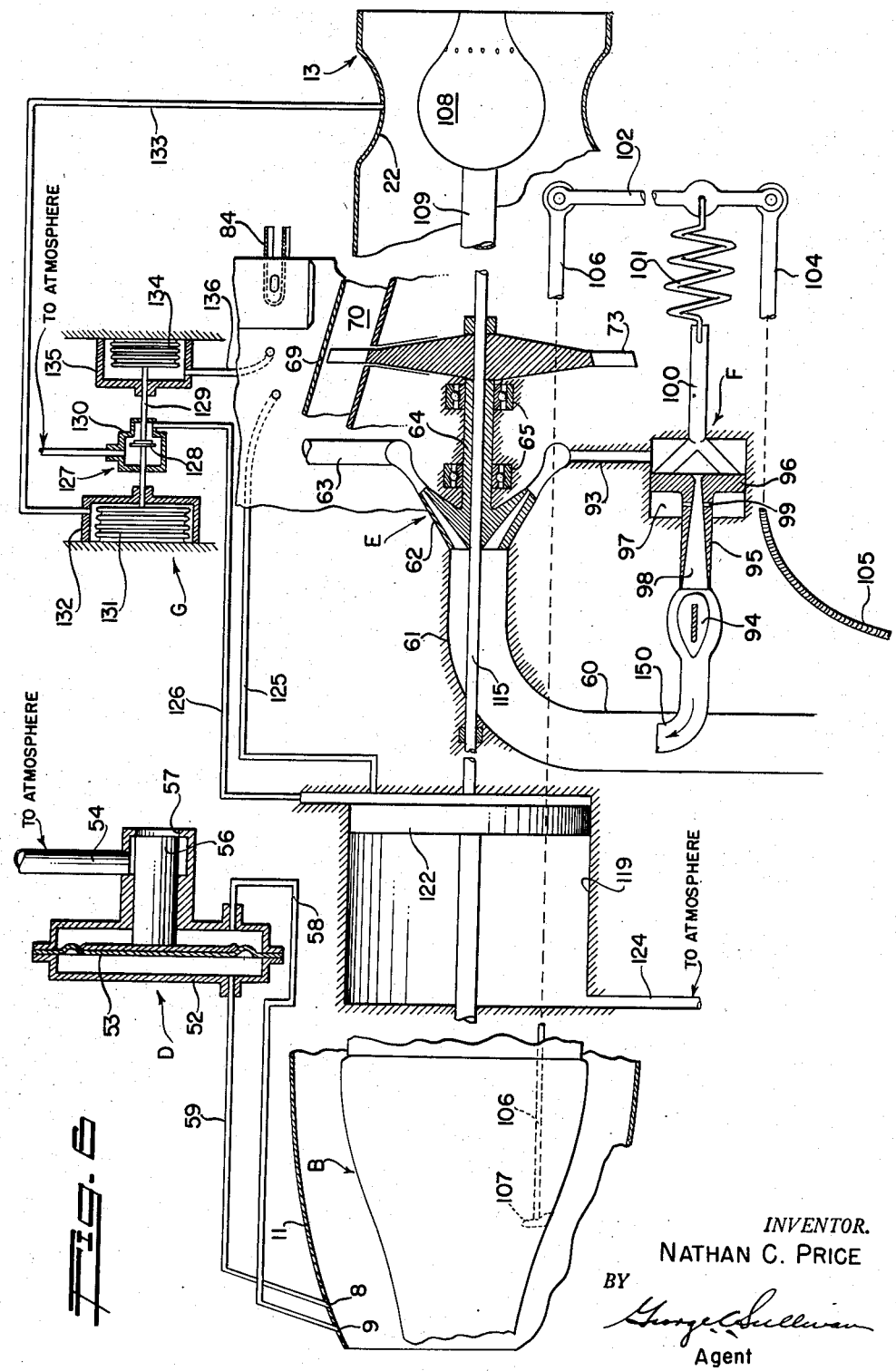
Figure 6 is a diagrammatic view of the fuel system and related parts.

The features of the present invention are intimately related with the several elements of the power plant and I will proceed with a general description of the mechanism, describing the invention in detail. The power plant may be said to comprise a shell A having an inlet ram II and an exhaust nozzle 13, an inlet needle B, an island C within the shell A, a control D for the movable needle, fuel injecting means E embodying the present invention and automatic controls F and G for the fuel system and nozzle respectively.

The shell A is an elongate tubular part intended to move in an air stream or to be submerged in the structure of the aircraft or missile. The shell has a generally cylindrical portion 12, the inlet ram II at its forward end and the nozzle section 13 at its rear end. The ram II is of the supersonic type being a tubular convergent-divergent form of inlet. The major cylindrical portion 12 of the shell is the combustion chamber of the power plant and is formed of heat resistant material such as "Inconel." The nozzle section 13 is secured to the rear end of the combustion chamber section 12 and is a tubular part having a restricted throat 22. The throat wall curves inwardly and rearwardly and then outwardly and rearwardly to a substantial cylindrical wall 24. A ring 27 for mounting the power plant may be secured in the annular external depression formed at the nozzle throat 22.

The needle B is movable in the supersonic rammed air inlet and diffuser 11 to vary the compressive effect and as shown is centrally and axially arranged in the inlet. The needle B, together with the island C, form an elongate streamlined assembly, the needle presenting a sharp forward tip 40 and having a tubular wall 41 telescoping over the island. The surface of the needle B is shaped to reflect the gentle shock waves of air toward a limited area on the interior of the ram 11 as indicated by the broken lines 42 in Figure 3. Forward and aft movement of the needle B moves the region of convergence of the shock waves 42 forwardly and rearwardly along the interior of the ram. The region of convergence of the shock waves 42 is an area of rather abrupt pressure rise and is utilized as a medium of control for the means D described below. The needle B has an internal pressure bulkhead 44 spaced rearwardly from its tip 40.

The island C is a hollow stationary assembly comprising a tubular forward section 45 and a rearwardly convergent rear section 46. The island C is supported by spaced hollow streamlined struts 47 secured to the shell A. A cap 49 on the forward end of the island is freely received in the needle B and the trailing portion of the needle has a sealing and bearing ring 48 sliding on the tubular section 45. A tubular shaft 50 is secured in the cap 49 and passes forwardly through an opening 51 in the bulkhead 44 to assist in supporting and guiding the needle.

The control D for the needle B determines the position of the needle to obtain an efficient compression of the rammed air at various speeds and altitudes. The control includes a diaphragm chamber 52 contained in the cap 49 and a flexible diaphragm 53 passing through the chamber. The diaphragm 53 controls an air vent passage 54 leading to the atmosphere. A pressure air port 55 in the needle section 41 maintains the space within the needle B between its bulkhead 44 and the cap 49 in communication with the pressure air inlet passage of the ram. The pressure in this space tends to move the needle B forwardly and this action is governed by controlling the vent passage 54. The diaphragm 53 operates a valve 56 which controls the inlet 57 of the vent passage 54. Air pressure in the interior of the needle B acts upon the outer end of the valve 56, tending to move the valve to the open position.

The valve 56 is sensitive to the position of the convergence and the intensity of the reflected shock waves 42. Tubes 58 and 59 communicate with the rear and forward sides respectively of the diaphragm chamber 52 and extend through a strut 47 and along the ram wall 11 to respectively communicate with the inlet passage at 9 and 8. The area adjacent the open end of the tap 9 of the tube 58 is the zone traversed by the converging shock waves 42 during forward and aft movement of the needle B accompanying variations of velocity of flight. During such variations in speed, for example in the range between a Mach number of 1 and a Mach number of 3, the needle B moves between its most rearward position and a forward position. The change in position of the needle B is affected by the pressures in the needle acting on the valve 56, assisted by the pressure admitted to one side of the diaphragm 53 by the line 58 and the pressure admitted to the other side of the diaphragm by the line 59. The opposed pressures acting upon the diaphragm 53 and its valve determine the position of the valve 56 and therefore control the position of the needle B. In practice the diaphragm 53 assumes a condition of equilibrium to stabilize the needle B in the correct adjusted position for any given velocity of the engine. This action is fully described in my co-pending application above referred to.

The fuel system E incorporating the features of the present invention comprises a fuel pump means for delivering liquid fuel to a vaporizing means. The pump 62 is preferably contained in the island C and is driven by an air turbine at the rear portion of the island. I have shown a fuel supply pipe 60 passing inwardly through one of the struts 47, from a fuel source (not shown), and provided with an elbow 61 having a rearwardly extending arm which is substantially coaxial with the island assembly. A centrifugal fuel pump 62 has its inlet or low pressure side connected with the elbow 61 and its high pressure side delivers fuel to pipes 63 extending outwardly and rearwardly through the struts 47. The shaft 64 of the pump is tubular, and is supported by spaced bearings 65 carried in a housing 66. The housing 66 has an outwardly extended peripheral flange 67 continuing rearwardly from the wall of the island and provided with spaced lugs 68 bolted to a surrounding shroud 69. The shroud in turn is carried by the spaced struts 47. The flange 67 and the shroud 69 define an annular rearwardly converging air passage 70 which is co-axial with the main air passage of the power plant. A substantially conical cap 71 is secured in the shroud in spaced relation to its internal surface to provide or leave a rearward continuation of the passage 70. This continuation of the passage is of rearwardly increasing capacity. Spaced rivets or bolts 72 may mount the cap 71 in the shroud 69. The cap 71 is spaced rearwardly from the housing flange 67 to leave an annular gap for an air turbine wheel 73. The wheel 73 is fixed to the pump shaft 64 and its blades operate in the air passage 70. The structure just described is best illustrated in Figures 3 and 4. It will be seen that air under pressure flowing through the passage 70 at a substantial velocity drives the turbine wheel 73, which in turn drives the fuel pump 62. The entrance of the annular passage 70 surrounds the aft or trailing portion of the island, and serves as a means for sucking away or removing the boundary layer air from island and needle B. This substantially increases the efficiency of the supersonic inlet ram or convergent-divergent inlet diffuser.

The vaporizing means of the fuel system includes an annular and tubular header 74 engaged in the shell section 12 at the struts 47. The above mentioned lines 63 from the pump 62 lead through the struts 47 to the header 74 to deliver liquid fuel thereto. A second annular header 75 is arranged adjacent and rearwardly of the header 74 and a third annular header 76 is secured in the rear portion of the combustion chamber 12. A series of circumferentially spaced vaporizing tubes 77 have their forward ends in communication with the supply header 74 and pass through openings in the wall of the header 75 to continue rearwardly to the rear header 76. The tubes 77 are spaced from the walls of the section 12 and their rear ends are received in openings in the wall of the rear header 76. A similar set of tubes 78 have their forward ends in communication with the header 75 and their rear ends communicate with the rear header 76. The tubes 77 and 78 are alternated in a single annular series. Liquid fuel supplied to the header 74 by the pump 62 flows through the tubes 77 and then forwardly through the tubes 78 to the header 75 and is effectively vaporized during this circuit. Strips 80 of heat resistant material are laced through the series of tubes 77 and 78 to hold them stabilized.

The fuel vaporized in the tubes 77 and 78 is delivered to vapor injecting devices 84 arranged in the entrance portion of the combustion chamber. Circumferentially spaced tubular bars 81 extend radially inward from the vapor header 75 and carry the injection devices. The header 75 discharges the vaporized fuel into the bars 81 for delivery to the injectors 84. The vapor injection devices 84 are fully described and claimed in my co-pending application Serial No. 783,536, filed November 1, 1947. An electrically energized glow plug 92 extends through an opening in the shell A to project into one of the hollow bars 81 for the purpose of igniting the fuel at the injecting devices 84.

With the fuel vaporizing and injecting means just described the air-fuel ratio remains substantially constant irrespective of the translational speed and altitude, the centrifugal fuel injecting pump 62 being driven by the rammed air supply through the medium of the turbine 73 to preserve this ratio. The fuel pump 62 and the turbine 73 are related and designed to provide an air-fuel ratio of approximately 18 to 1. When the translational movement of the engine reaches the value of a Mach number of approximately 3, this air-fuel ratio causes the spouting velocity of the air and gases of combustion from the nozzle 13 to be approximately twice that of the translational velocity, bringing the point of maximum thrust into coincidence with that required for maximum range of flight and high economy. At lower flight Mach numbers the air-fuel mixture should be leaner, although it may be important and desirable to obtain maximum thrust under certain conditions at such low velocities. It may also be necessary to vary the thrust at any velocity of flight. The control means F is provided to permit regulation or variation of the thrust as may be required regardless of fuel economy.

The control means F is in the form of a controlled by-pass between the low pressure pipe 60 of the pump 62 and one of its high pressure pipes 63. The by-pass 93 has a nozzle like part 150 in the fuel supply pipe 60 arranged to discharge the by-pass fuel in the direction of the fuel flow. This positioning of the nozzle part 150 prevents cavitation in the pump 62. An adjustable constant flow valve is interposed in the by-pass 93. This valve includes a stationary island 94 of streamlined configuration arranged in the path of fuel flow and a "floating" tubular venturi 95 movable toward and away from the island so as to cooperate therewith in restricting the fuel flow through the by-pass 93 to a greater or lesser degree. The Venturi member 95 carries a piston 96 operating in a cylinder 97 connected in the by-pass line 93. The passage 98 of the Venturi member 95 continues through the piston 96 having its entrance mouth at the upstream side of the piston and its exit in opposed relation to the island 94. Relatively small ports 99 lead from the restricted throat of the Venturi passage 98 to the downstream side of the cylinder 97 to balance the pressures on the opposite side of the piston. With the valve structure just described the Venturi member 95 is constantly urged toward the island 94 by the fuel flow to restrict the flow.

The control F regulates the tendency of the member 95 to move toward its closed position and thus regulates flow through the by-pass 93. A rod 100 is connected with the piston 96 and its outer end is connected with a tension spring 101. The spring 101 is in turn connected with a lever 102 which has one end fulcrumed to a member 104. The member 104 is adapted to be adjusted or set by a Bowden wire 105 extending from the engine for association with a manual control or other means for changing the air-fuel ratio. A rod 106 is pivotally connected with the other end of the lever 102 and extends forwardly for connection with a clip 107 on the needle bulkhead 44, so that the air-fuel ratio is automatically maintained by the position of the needle B to obtain maximum fuel economy at various velocities.

The nozzle control G includes a throat member 108 movable axially in the nozzle opening. The member 108 is a hollow element formed of heat resistant material and its major portion is substantially spherical to obtain an efficient action in the supersonic nozzle 13. The rear portion of the throat member 108 is extended and defined by a reverse curve. The member 108 is shiftably supported on a central tube 109 secured in the rear of the shroud 69 and extending rearwardly through the combustion chamber to the extremity of the nozzle 13. The tube 109 conducts air under pressure exhausted by the turbine 73 and shroud 69 and carries this air rearwardly for ultimate discharge at the nozzle region of the engine to assist the thrust or propulsive action. The rear portion of the tube 109 is pinched in at X to obtain a nozzle effect for the discharging air and to preserve a desirable back pressure in the tube for the cooling of the throat member 108 and the other parts as described below. The tube 109 is formed of heat resistant material and is preferably coated with ceramic paint.

The throat member 108 has a pin and slot connection with the tube 109. Axial slots 110 are formed in diametrically opposite wall portions of the tube and a rod 111 carried by the throat member extends through the slots. A tubular spacer 112 is provided on the rod within the tube 109. It will be observed that the slots 110 maintain the interior of the throat member 108 in communication with the tube 109 so that cooling air is free to flow from the tube into the member. A series of spaced ports 113 pass through the rear wall portion of the throat member to exhaust the cooling air and thus maintain a circulation of air through the hollow member. Furthermore, the sliding fit of the member 108 on the tube 109 may be such as to allow the limited escape of cooling air under pressure to further assist in maintaining an air flow through the member. It will be seen that the exhaust of the air turbine 73 is utilized to cool the tube 109, the throat member 108 and the parts associated therewith.

Spaced struts 114 serve to support the tube 109 in the rear portion of the engine. The struts 114 are secured to the tube as by welding, and are suitably attached to the wall of the nozzle section 13. The struts 114 are streamlined in transverse cross section and are tubular. The interiors of the tubular struts 114 communicate with the interior of the tube 109 to receive cooling air therefrom and the outer ends of the tubes are open to discharge into the atmosphere. During operation of the power plant there is a continuous flow of cooling air through the supporting struts 114.

A rod 115 is connected with the spacer 112 and the cross rod 111 of the throat member 108 and extends forwardly through the tube 109 being supported in the tube by one or more bearings 117. The rod 115 continues forwardly through an axial opening 116 in the pump shaft 64 and a seal 17 on the pump rotor prevents leakage around the rod. The rod 115 passes forwardly through the elbow 61 and a packing gland 118 on the elbow to extend into a cylinder 119 secured in the island C. A sleeve 120 on the rod 115 slidably enters an opening 121 in the shaft 50 and the shaft 50 has its rear end secured in an opening in the forward wall of the cylinder. The cylinder 119 is of substantial diameter and a piston 122 is fixed on the sleeve 120 to operate in the cylinder. A vent pipe 124 passes through a strut 47 and the island C to the forward end of the cylinder 119 to vent this portion of the cylinder to the atmosphere. A pressure line 125 leads from the entrance portion of the combustion chamber to the rear end of the cylinder 119 to deliver air under pressure to the cylinder. A pressure bleed line 126 extends from the rear end of the cylinder 119 through the island C and a strut 47 to discharge into the atmosphere. The bleed line 126 is controlled by a relay valve 127 actuated by instrumentalities sensitive to the pressures at the entrance of the combustion chamber and at the throat of the propulsive nozzle. A closure 128 of the valve 127 is fixed to a stem 129 to cooperate with a seat 130 to control flow through the bleed. An evacuated bellows 131 is secured to one end of the stem 129 and is contained in a closed chamber 132. A line 133 maintains the interior of the chamber 132 in communication with the throat of the nozzle 13. The resiliency of the bellows tends to move the closure 128 toward its seat 130, while pressure from the throat of the nozzle 13 acts on the bellows to urge the closure away from its seat. A second evacuated bellows 134 is housed in a chamber 135 and is secured to the other end of the stem 129. A line 136 maintains the chamber 135 in communication with the entrance portion of the combustion chamber. The control for the throat member 108 just described operates on the principle that the critical pressure in the throat of the nozzle should be approximately .53 times the pressure at the entrance of the combustion chamber, assuming that the flow at the nozzle throat has reached a velocity of one Mach number. The bellows 131 and 134 are related and proportioned to preserve this ratio. Gas pressure in the nozzle results in a pressure tending to move the nozzle member 108 downstream while pressures acting on the rear side of the piston 122 tend to move the member 108 upstream. This latter action is limited by the value of approximately .53 impressed on the relay valve 127 and therefore on the piston 122 by the proportioned bellows 131 and 134.

In operation it may be assumed that the engine is associated with an air borne missile for aircraft to form a propulsive means therefor and that the missile or craft carries the fuel supply and controls. The missile or aircraft is brought up to or beyond the speed of sound by other propulsive means; for example, by rocket power or turbo-jet propulsive devices. To start the engine current is supplied to the glow plug 92 and fuel is supplied to the main fuel line 60. Air flow through the annular passage 70 operates the air turbine 73 which in turn drives the pump 62 to supply fuel to the vaporizing means. The fuel flows through the tubes 76 and 77 to the struts 47 and bars 81 so that fuel is ignited at the glow plug and the flame progresses through the adjacent bar 81 to the several series of devices 84.

The fuel is thoroughly vaporized during its passage through the tubes 77 and 78 and is consumed upon admission to the high pressure combustion chamber at the devices 84. The gases of combustion and the heated air are spouted from the nozzle 13 at a high velocity to produce a substantial forward thrust. The centrifugal pump 62 driven by the air turbine 73 and the associated by-pass control maintains an efficient air-fuel ratio in the combustion chamber at the various speeds of operation. The movement of the needle B in the ram inlet 11 controls flow through the fuel by-pass 93 to automatically preserve the optimum air-fuel ratio. The means D which automatically adjusts the position of the needle B brings the needle into the position where it most effectively utilizes the highly efficient compressive action of the gentle shock waves 42 in the ram inlet. The fuel supply system in addition to being automatically controlled by movement of the needle B is capable of adjustment or regulation by movement of the fulcrum member 104. The member 104 may be shifted or set either manually or by a remote control to obtain an increased or decreased thrust. The control G automatically regulates the effective area of the propulsive nozzle 13 to produce an effective propulsion action at the various compression ratios and air-fuel ratios. As above described, the control G operates to maintain a substantially constant ratio of approximately 1 to .53 between the initial combustion chamber pressure and the critical nozzle throat pressure.

Having described only a typical embodiment of the invention, I do not wish to be limited to the specific details herein set forth but wish to reserve to myself any variations or modifications that may appear to those skilled in the art and/or fall within the scope of the following claims.

I claim:

1. A reactive propulsion power plant comprising a tubular shell having a ram inlet at its forward end, a propulsive nozzle at its rear end and a combustion chamber between its ends, an island in the shell at the upstream side of the combustion chamber, a shroud spaced around the aft end portion of the island to leave an air passage, means for injecting fuel into the combustion chamber, a pump in the island for pumping fuel to the injecting means, an air turbine for driving the pump including a turbine wheel housed in the aft portion of the island and blading on the wheel extending into said air passage to be acted upon by the rammed air flowing therethrough, said air passage having its entrance at the aft surface portion of the island to remove boundary layer air from the surface of the island.

2. A reactive propulsion power plant comprising a tubular shell having a ram inlet at its forward end, a propulsive nozzle at its rear end and a combustion chamber between its ends, an island in the shell at the upstream side of the combustion chamber, a shroud spaced around the island to leave an air passage, means for injecting fuel into the combustion chamber, a pump in the island for pumping fuel to the injecting means, an air turbine for driving the pump including a turbine wheel in the island having blading in said air passage to be acted upon by the rammed air flowing therethrough, and a tube extending rearwardly from said passage to the propulsive nozzle for discharging the air turbine exhaust air in the region of the nozzle.

3. A reactive propulsive power plant comprising a tubular shell having a ram inlet at its forward end, a propulsive nozzle at its rear end, and a combustion chamber intermediate its ends, fuel injecting means for the combustion chamber, a pump for supplying fuel to the combustion chamber, an air turbine in the shell at the upstream side of the combustion chamber for driving the pump, means for directing a portion of the rammed air from the inlet to the turbine to drive the same, a duct extending rearwardly from the turbine through the combustion chamber to the nozzle to convey the exhaust air from the turbine, and a throat member in the propulsive nozzle supported by said duct.

4. A reactive propulsion power plant comprising a tubular shell having a ram inlet at its forward end, a propulsive nozzle at its rear end, and a combustion chamber intermediate its ends, fuel injecting means for the combustion chamber, a pump for supplying fuel to the combustion chamber, an air turbine in the shell at the upstream side of the combustion chamber for driving the pump, means for directing a portion of the rammed air from the ram inlet to the turbine to drive the same, a duct extending rearwardly from the turbine through the combustion chamber to the nozzle to convey the exhaust air from the turbine, a hollow throat member supported in the propulsive nozzle by the duct, and means for leading a portion of said exhaust air from the duct into the throat member to cool the same.

5. A reactive propulsion power plant comprising a tubular shell having a ram inlet at its forward end, a propulsive nozzle at its rear end, and a combustion chamber intermediate its ends, fuel injecting means for the combustion chamber, a pump for supplying fuel to the combustion chamber, an air turbine in the shell at the upstream side of the combustion chamber for driving the pump, means for directing a portion of the rammed air from the inlet to the turbine to drive the same, a tube extending rearwardly from the turbine through the combustion chamber to the nozzle to carry the air exhausted by the turbine for discharge at the nozzle, a throat member for the nozzle carried by said tube, and means for utilizing a portion of said exhaust air flowing through said tube to cool the throat member.

6. A reactive propulsion power plant comprising a tubular shell having a ram inlet at its forward end, a propulsive nozzle at its rear end, and a combustion chamber intermediate its ends, fuel injecting means for the combustion chamber, a pump for supplying fuel to the combustion chamber, an air turbine in the shell at the upstream side of the combustion chamber for driving the pump, means for directing a portion of the rammed air from the ram inlet to the turbine to drive the same, a tube extending rearwardly from the turbine through the combustion chamber to the nozzle to carry the air exhausted by the turbine for discharge at the nozzle, a throat member for the nozzle carried by said tube, and a nozzle restriction at the rear end of the tube for discharging said exhaust air in the form of a propulsive jet.

7. A reactive propulsion power plant comprising a tubular shell having a ram inlet at its forward end, a propulsive nozzle at its rear end, and a combustion chamber intermediate its ends, fuel injecting means for the combustion chamber, a pump for supplying fuel to the combustion chamber, an air turbine in the shell at the upstream side of the combustion chamber for driving the pump, means for directing a portion of the rammed air from the inlet to the turbine to drive the same, a tube extending rearwardly from the turbine through the combustion chamber to the nozzle to carry the air exhausted by the turbine for discharge at the nozzle, a throat member for the nozzle carried by said tube, the throat member being hollow and having communication with the interior of said tube, and a nozzle restriction at the rear end of said tube for discharging said air in the form of a propulsive jet and for creating back pressure in the tube to assure cooling air flow into the throat member.

8. A reactive propulsion power plant comprising a tubular shell having a ram inlet at its forward end, a propulsive nozzle at its rear end, and a combustion chamber intermediate its ends, fuel injecting means for the combustion chamber, a pump for supplying fuel to the combustion chamber, an air turbine in the shell at the upstream side of the combustion chamber for driving the pump, means for directing a portion of the rammed air from the inlet to the turbine to drive the same, a tube extending rearwardly from the turbine through the combustion chamber to the nozzle to carry the air exhausted by the turbine for discharge at the nozzle, a throat member for the nozzle carried by said tube, and at least one tubular strut supporting said tube in the shell and having one end in communication with the tube and the other end in communication with the atmosphere to be cooled by air flow therethrough from the tube.

9. A reactive propulsion power plant comprising a tubular shell having a ram inlet at its forward end, a propulsive nozzle at its rear end, and a combustion chamber intermediate its ends, fuel injecting means for the combustion chamber, a pump for supplying fuel to the combustion chamber, an air turbine in the shell at the upstream side of the combustion chamber for driving the pump, means for directing a portion of the rammed air from the ram inlet to the turbine to drive the same, a tube receiving the exhaust air from the turbine and extending rearwardly to the nozzle, a hollow throat member for the nozzle shiftably carried by the tube, a rod for adjusting the throat member extending through the tube, the wall of the tube having a slot placing the interior of the throat member in communication with the tube so that the member is cooled by said exhaust air, and a bar on the throat member extending through said slot and connected with the rod to connect the rod and member.

10. A reactive propulsion engine comprising a tubular shell having a ram inlet at its forward end, a propulsive nozzle at its rear end, and a combustion chamber between its ends, means for injecting fuel into the combustion chamber, a tube receiving a portion of the rammed air supply and extending rearwardly through the combustion chamber to the nozzle to discharge said air rearwardly from the nozzle, a throat member for the nozzle shiftably carried by the tube, the member being hollow and having communication with the interior of the tube to receive cooling air therefrom, there being ports through the wall of the throat member to discharge the cooling air, and means for shifting the throat member including a part extending through the tube and connected with the member.

11. A reactive propulsion engine comprising a tubular shell, having a combustion chamber and having a propulsive nozzle at its rear end, an inlet ram for the forward end of the shell comprising a supersonic diffuser, a substantially centrally positioned element in the diffuser for assisting its compressive action, a pump for supplying fuel to the combustion chamber, a shroud spaced around the rear portion of the element to leave an air passage for receiving a portion of the rammed air, said passage having its forward air-receiving entrance around the rear portion of the element to receive and remove boundary layer air from the surface of the element, and an air turbine for driving the pump and having blading in said passage acted upon by the air flow therethrough.

12. A reactive propulsion engine comprising a tubular shell, having a combustion chamber and having a propulsive nozzle at its rear end, an inlet ram for the forward end of the shell comprising a supersonic diffuser, a substantially centrally positioned element in the diffuser for assisting its compressive action, means for supplying fuel to the combustion chamber, a movable throat member for the nozzle, and means in said element for controlling the position of the throat member.

NATHAN C. PRICE.

References Cited in the file of this patent

UNITED STATES PATENTS

| Number | Name | Date |
|---|---|---|
| 1,369,672 | Koenig | Feb. 22, 1921 |
| 2,432,359 | Streid | Dec. 9, 1947 |
| 2,540,594 | Price | Feb. 6, 1951 |
| 2,566,319 | Deacon | Sept. 4, 1951 |
| 2,610,464 | Knoll | Sept. 16, 1952 |

FOREIGN PATENTS

| Number | Country | Date |
|---|---|---|
| 50,033 | France | Aug. 1, 1939 |
| | (Addition to No. 779,655) | |